US009178724B2

(12) United States Patent
Hosobe et al.

(10) Patent No.: US 9,178,724 B2
(45) Date of Patent: Nov. 3, 2015

(54) GATEWAY APPARATUS, RELAY METHOD, PROGRAM, FEMTO SYSTEM

(75) Inventors: Hideumi Hosobe, Tokyo (JP); Yoshio Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 433 days.

(21) Appl. No.: 13/514,811

(22) PCT Filed: Nov. 29, 2010

(86) PCT No.: PCT/JP2010/006932
§ 371 (c)(1),
(2), (4) Date: Jun. 8, 2012

(87) PCT Pub. No.: WO2011/070740
PCT Pub. Date: Jun. 16, 2011

(65) Prior Publication Data
US 2012/0245928 A1    Sep. 27, 2012

(30) Foreign Application Priority Data

Dec. 10, 2009   (JP) ................... 2009-280154

(51) Int. Cl.
*H04L 12/66*   (2006.01)
*H04W 28/10*   (2009.01)
(Continued)

(52) U.S. Cl.
CPC ............... *H04L 12/66* (2013.01); *H04W 28/20* (2013.01); *H04W 4/18* (2013.01); *H04W 28/04* (2013.01); *H04W 84/045* (2013.01); *H04W 88/04* (2013.01); *H04W 88/16* (2013.01); *H04W 92/24* (2013.01)

(58) Field of Classification Search
CPC ..... H04L 65/80; H04L 41/0896; H04L 47/10;
H04L 47/22; H04L 69/04; H04W 28/20;
H04W 28/22; H04W 28/02; H04W 28/06;
H04W 28/10; H04W 84/045; H04W 88/181;
H04B 1/406
USPC ................................... 370/232, 468
See application file for complete search history.

(56) References Cited

U.S. PATENT DOCUMENTS 6,697,642 B1 *   2/2004   Thomas ............... 455/562.1
6,754,221 B1   6/2004   Whitcher et al.
(Continued)

FOREIGN PATENT DOCUMENTS

JP   2002-185554 A   6/2002
JP   2003-163916 A   6/2003
(Continued)

OTHER PUBLICATIONS
3GPP TS 25.467, UTRAN Architecture for 3G Home Node B (HNB); 3rd Generation Partnership Project; Technical Specification Group Radio Access Network, V8.3.0, Sep. 2009, pp. 1-26.
(Continued)

*Primary Examiner* — Alpus H Hsu
*Assistant Examiner* — Elton Williams
(74) *Attorney, Agent, or Firm* — Foley & Lardner LLP

(57) ABSTRACT

In order to avoid deterioration in sound quality caused by band shortage between an HNB-GW and an HNB, in a femto system 100, an HNB-GW 140 is connected to an HNB 120 via a network 130, and relays at least one of transmission and reception of voice data between an MGW 170 and the HNB 120. A narrow band determination unit 150 in the HNB-GW 140 determines whether the band of the network 130 is a narrow band which is equal to or lower than a predetermined threshold. When it is determined that the band is a narrow band by the narrow band determination unit 150, a conversion unit 160 converts the voice data to decrease a bit rate of the voice data transferred to the HNB 120 from the MGW 170.

20 Claims, 18 Drawing Sheets

(51) Int. Cl.
  *H04B 1/66* (2006.01)
  *H04W 28/20* (2009.01)
  *H04W 4/18* (2009.01)
  *H04W 28/04* (2009.01)
  *H04W 88/04* (2009.01)
  *H04W 88/16* (2009.01)
  *H04W 92/24* (2009.01)
  *H04W 84/04* (2009.01)

(56) References Cited

U.S. PATENT DOCUMENTS

| | | | |
|---|---|---|---|
| 7,181,209 | B2 | 2/2007 | Tamura |
| 7,295,549 | B2 * | 11/2007 | Pepin et al. .................. 370/352 |
| 7,668,550 | B2 | 2/2010 | Tamura |
| 2004/0022252 | A1 * | 2/2004 | Jang et al. ................. 370/395.52 |
| 2004/0254786 | A1 * | 12/2004 | Kirla et al. .................... 704/216 |
| 2007/0091805 | A1 * | 4/2007 | Ramprashad et al. ..... 370/230.1 |
| 2007/0195749 | A1 | 8/2007 | Kakimoto |
| 2008/0062877 | A1 * | 3/2008 | Chen .............................. 370/235 |
| 2008/0137541 | A1 * | 6/2008 | Agarwal et al. ............... 370/241 |
| 2010/0046416 | A1 | 2/2010 | Mizukoshi |

FOREIGN PATENT DOCUMENTS

| | | |
|---|---|---|
| JP | 2006-254044 A | 9/2006 |
| JP | 2008-72599 A | 3/2008 |
| JP | 2008-211568 A | 9/2008 |
| JP | 2011124869 A | 6/2011 |
| WO | WO 2005/089008 A1 | 9/2005 |
| WO | WO 2007/035462 A2 | 3/2007 |
| WO | WO 2008/070869 A2 | 6/2008 |
| WO | WO 2008/087988 A1 | 7/2008 |
| WO | WO2008/108379 A1 | 9/2008 |
| WO | WO2009/128515 A1 | 10/2009 |
| WO | WO 2009/133772 A1 | 11/2009 |

OTHER PUBLICATIONS

3GPP TS 25.469, UTRAN Iuh interface Home Node B Application Part (HNBAP) Signalling, $3^{rd}$ Generation Partnership Project; Technical Specification Group Radio Access Network, V8.3.0, Sep. 2009, pp. 1-59.

3GPP TS 24.008, Mobile Radio Interface Layer 3 Specification; Core Network Protocols; $3^{rd}$ Generation Partnership Project; Technical Specification Group Core Network and Terminals, V8.7.0, Sep. 2009, pp. 1-587.

3GPP TS 25.413, UTRAN Iu interface, Radio Access Network Application Part (RANAP) Signalling, $3^{rd}$ Generation Partnership Project; Technical Specification Group Radio Access Network, V8.4.0, Sep. 2009, pp. 1-398.

H. Schulzrinne et al., RTP: A Transport Protocol for Real-Time Applications, RFC 1889, Standards Track, Jan. 1996, pp. 1-75.

3GPP TS 25.468, UTRAN Iuh Interface RANAP User Adaption (RUA) Signalling, $3^{rd}$ Generation Partnership Project; Technical Specification Group Radio Access Network, V8.1.0, Mar. 2009, pp. 1-43.

3GPP TS 25.469, UTRAN Iuh interface Home Node B Application Part (HNBAP) Signalling, $3^{rd}$ Generation Partnership Project; Technical Specification, V8.2.0 Release 8, Jul. 2009 (60 pgs.).

Extended European Search Report mailed Jan. 31, 2014 in related European Application No. 10835668.4 (10 pgs.).

Office Action mailed Sep. 2, 2014 in related Japanese Application No. 2011-545067 with English-language translation (6 pgs.).

Office action mailed Jun. 19, 2015 in related European Application No. 10835668.4 (8 pgs.).

\* cited by examiner

EXAMPLE OF [HNBAP: HNB REGISTRER REQUEST]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| LAN bandwidth | O | | 9.2.xx | | YES | ignore |

Fig. 5

EXAMPLE OF [HNBAP: HNB REGISTRER REQUEST]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| AMR frame multiplexing support | O | | 9.2.xx | | YES | ignore |

Fig. 7

EXAMPLE OF [HNBAP: HNB REGISTRER ACCEPT]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |
| maxptime | O | | 9.2.xx | | YES | ignore |

Fig. 8

EXAMPLE OF [HNBAP: HNB REGISTRER REQUEST]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| DL Mux Port Number | O | | 9.2.xx | | YES | ignore |

Fig. 10

EXAMPLE OF [HNBAP: HNB REGISTRER ACCEPT]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| RNC-ID | M | | 9.2.26 | | YES | reject |
| UL Mux Port Number | O | | 9.2.xx | | YES | ignore |
| Length Indicator | O | | 9.2.xx | | YES | ignore |

Fig. 11

EXAMPLE OF [HNBAP: HNB REGISTRER REQUEST]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| UDP packet multiplexing support | O | | 9.2.xx | | YES | ignore |

Fig. 13

EXAMPLE OF [HNBAP: HNB REGISTRER ACCEPT]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |
| Maximum Message Size | O | | 9.2.xx | | YES | ignore |

Fig. 14

EXAMPLE OF [HNBAP: HNB REGISTRER REQUEST]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| deflate support | O | | 9.2.xx | | YES | ignore |

Fig. 16

EXAMPLE OF [HNBAP: HNB REGISTRER ACCEPT]

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |
| deflate | O | | 9.2.xx | | YES | ignore |

Fig. 17

GATEWAY APPARATUS, RELAY METHOD, PROGRAM, FEMTO SYSTEM

This application is the National Phase of PCT/JP2010/006932, filed Nov. 29, 2010, which claims priority to Japanese Application No. 2009-280154, filed Dec. 10, 2009, the disclosures of which are hereby incorporated by reference in their entirety.

TECHNICAL FIELD

The present invention relates to a relay technique, and more particularly, to a technique for relaying voice data between a media gateway and a femtocell.

BACKGROUND ART

The intensity of radio waves is poor in underground areas, back of buildings, and boundary areas of related mobile phone base stations having call areas of several hundreds of meters to more than ten kilometers in radius. One problem occurred in these areas is that it is difficult to connect to the base stations. One system provided in order to solve this problem is a micro base station having a call area of about several tens of meters in radius where phone calls can be made even in those areas. Such a micro base station is called a femtocell. In the following description, a system in which a femtocell is arranged is called a femto system.

FIG. 18 shows an example of a femto system. A femto system 10 includes a femtocell 30, a gateway apparatus 50, a media gateway 52, and a line switching unit 54. While the media gateway 52 may be included in the line switching unit 54, the media gateway 52 and the line switching unit 54 will be separately shown and described for the sake of clarification.

In the following description, the femtocell, the gateway apparatus, the media gateway, and the line switching unit are denoted by a Home Node B (HNB), a Home Node B Gateway (HNB-GW), a Media Gateway (MGW), and a Mobile-service Switching Center (MSC). Further, each terminal apparatus 20 connected to the HNB 30 is denoted by a User Equipment (UE).

The gateway apparatus 50 relays transmission and reception of voice data between the MGW 52 and the HNB 30, and is connected to the HNB 30 through a network 40. The voice data in the phone call is transmitted to the UE 20 through the MGW 52, the HNB-GW 50, the network 40, and the HNB 30 in this order, or transmitted from the UE 20 through the HNB 30, the network 40, the HNB-GW 50, and the MGW 52 in this order. Further, as described in a non-patent literature 6 and a non-patent literature 1, "The RUA has the following functions: Transparent transfer of RANAP messages", "Iu UP is terminated in CN and HNB (i.e. not in the HNB GW), which means that, in the HNB-GW 50, data whose level is higher than Iu-UP and RANAP are transparently transferred, and the MSC 54/MGW 52, the HNB 30, and the UE 20 are adapted to use the same codec.

CITATION LIST

Non Patent Literature

NPTL 1: 3GPP TS 25.467 UTRAN architecture for 3G Home Node B (V8.3.0)
NPTL 2: 3GPP TS 25.469 UTRAN Iuh interface Home Node B Application Part (V8.3.0)
NPTL 3: 3GPP TS 24.008 Core network protocols (V8.7.0)
NPTL 4: 3GPP TS 25.413 UTRAN Iu interface RANAP signalling (V8.4.0)
NPTL 5: RFC 1889 RTP
NPTL 6: 3GPP TS 25.468 UTRAN Iuh Interface RANAP User Adaptation signalling

SUMMARY OF INVENTION

Technical Problem

By the way, the network 40 that connects the HNB 30 and the HNB-GW 50 is typically a general-purpose line including the Internet (registered trademark) or an intranet. When the band of the general-purpose line is narrow, degradation in sound quality may occur due to band shortage.

On the other hand, the construction of a femto system using a line having wide band, e.g., a satellite link, as the network 40 could solve the problem of the band shortage between the HNB-GW 50 and the HNB 30. However, it is required that both of the HNB-GW 50 and the HNB 30 correspond to the satellite link, which requires high cost. Thus, it is difficult to spread the femto system.

The present invention has been made in view of the aforementioned study, and provides a technique which can avoid degradation in sound quality even when a band of a network connecting an HNB-GW and an HNB is narrow in a femto system.

Solution to Problem

One exemplary aspect of the present invention is a gateway apparatus connected to a femtocell via a network and relaying at least one of transmission and reception of voice data between a media gateway and the femtocell. This gateway apparatus includes a narrow band determination unit for determining whether a band of the network is a narrow band which is equal to or lower than a predetermined threshold, and a conversion unit for converting the voice data to decrease a bit rate of the voice data transferred to the femtocell from the media gateway when it is determined by the narrow band determination unit that the band is a narrow band.

Note that such an exemplary aspect in which the gateway apparatus according to the above exemplary aspect is changed to a method or a system, a system including the gateway apparatus, a program for operating a computer as the gateway apparatus, a recording medium for recording the program, and the like are also effective as exemplary aspects of the present invention.

Advantageous Effects of Invention

According to a technique of the present invention, it is possible to avoid degradation in sound quality even when a band of a network connecting an HNB-GW and an HNB is narrow in a femto system.

BRIEF DESCRIPTION OF DRAWINGS

FIG. 5 is a diagram showing an example of an "HNBAP: HNB REGISTER REQUEST" message transmitted by an HNB in the femto system according to the second exemplary embodiment of the present invention;

FIG. 7 is a diagram showing an example of an "HNBAP: HNB REGISTER REQUEST" message transmitted by the HNB in the femto system according to the fifth exemplary embodiment of the present invention;

FIG. 8 is a diagram showing an example of an "HNBAP: HNB REGISTER ACCEPT" message transmitted by an HNB-GW in the femto system according to the fifth exemplary embodiment of the present invention;

FIG. 10 is a diagram showing an example of an "HNBAP: HNB REGISTER REQUEST" message transmitted by the HNB in the femto system according to the sixth exemplary embodiment of the present invention;

FIG. 11 is a diagram showing an example of an "HNBAP: HNB REGISTER ACCEPT" message transmitted by an HNB-GW in the femto system according to the sixth exemplary embodiment of the present invention;

FIG. 13 is a diagram showing an example of an "HNBAP: HNB REGISTER REQUEST" message transmitted by the HNB in the femto system according to the seventh exemplary embodiment of the present invention;

FIG. 14 is a diagram showing an example of an "HNBAP: HNB REGISTER ACCEPT" message transmitted by an HNB-GW in the femto system according to the seventh exemplary embodiment of the present invention;

FIG. 16 is a diagram showing an example of an "HNBAP: HNB REGISTER REQUEST" message transmitted by the HNB in the femto system according to the eighth exemplary embodiment of the present invention;

FIG. 17 is a diagram showing an example of an "HNBAP: HNB REGISTER ACCEPT" message transmitted by an HNB-GW in the femto system according to the eighth exemplary embodiment of the present invention.

DESCRIPTION OF EMBODIMENTS

Figure 1:
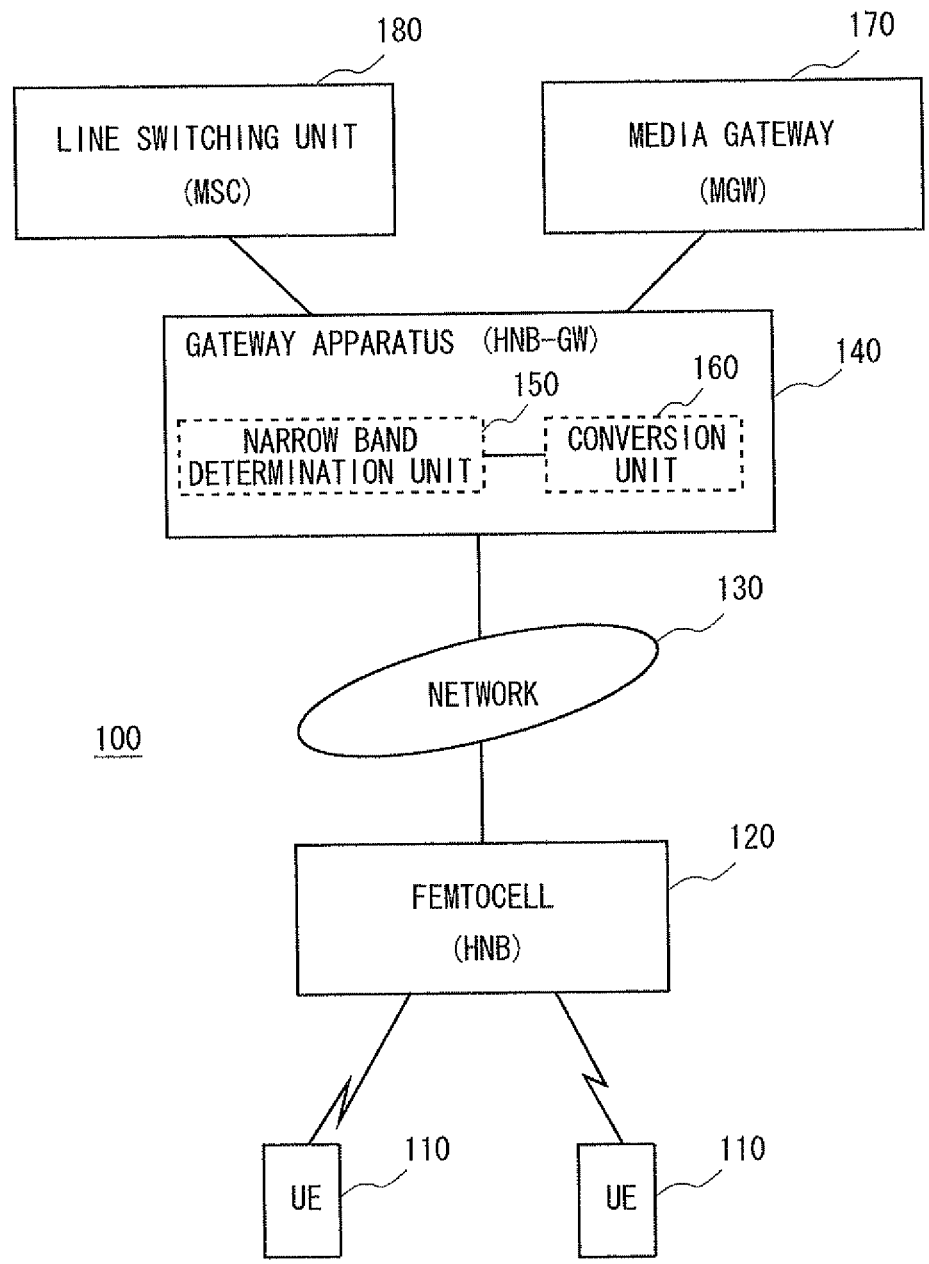
FIG. 1 is a diagram showing a femto system according to a first exemplary embodiment of the present invention.

Hereinafter, with reference to the drawings, exemplary embodiments of the present invention will be described. For the clarification of description, the following description and the drawings are omitted and simplified as appropriate. Further, each element shown in the drawings as functional blocks performing various processing may be formed of a CPU, a memory, and other circuits in hardware, and may be achieved by a program loaded to a memory in software. Accordingly, a person skilled in the art would understand that these functional blocks may be achieved in various ways, e.g., only by hardware, only by software, or the combination thereof without any limitation. The program described above can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

<First Exemplary Embodiment>

FIG. 1 shows a femto system 100 according to a first exemplary embodiment of the present invention. The femto system 100 is based on the specification defined by a Third Generation Partnership Project (3GPP), and includes a femtocell (HNB) 120, a gateway apparatus (HNB-GW) 140, a media gateway (MGW) 170, and a line switching unit (MSC) 180. The HNB-GW 140 relays transmission/reception of voice data between the MGW 170 and the HNB 120, and is connected to the HNB 120 through a network 130 such as the Internet. The HNB-GW 140 includes a narrow band determination unit 150 and a conversion unit 160.

Each terminal (UE) 110 connects to the HNB 120 to perform a phone call. The voice data of the phone call is transmitted to the UE 110 through the MGW 170, the HNB-GW 140, the network 130, and the HNB 120 in this order, and is transmitted from the UE 110 through the HNB 120, the network 130, the HNB-GW 140, and the MGW 170 in this order.

The femto system 100 is similar to a typical type of this system except the HNB-GW 140. Thus, description of only the HNB-GW 140 will be made in detail. Further, the HNB-GW 140 includes the same components and functions as those of a typical HNB-GW except that the HNB-GW 140 includes the narrow band determination unit 150 and the conversion unit 160. Thus, only the narrow band determination unit 150 and the conversion unit 160 of the HNB-GW 140 will be described in detail.

The narrow band determination unit 150 determines whether the band of the network 130 is a narrow band, and outputs the determination result to the conversion unit 160. More specifically, when the band of the network 130 is equal to or smaller than a predetermined threshold, e.g., 200 kbps, it is determined that the band is a narrow band; when the band of the network 130 is larger than the threshold, it is determined that the band is not a narrow band.

In the first exemplary embodiment, the narrow band determination unit 150 determines whether the band is a narrow band based on the location in which the HNB 120 is arranged. In the narrow band determination unit 150, narrow band location information indicating the location of the narrow band is registered in a database in advance. This narrow band location information is any one of parameters defined by the 3GPP (HNB Location Information), Location Area Code (LAC), Routing Area Code (RAC), Service Area Code (SAC) disclosed in the non-patent literature 2, for example, or may be the combination thereof.

Figure 2:
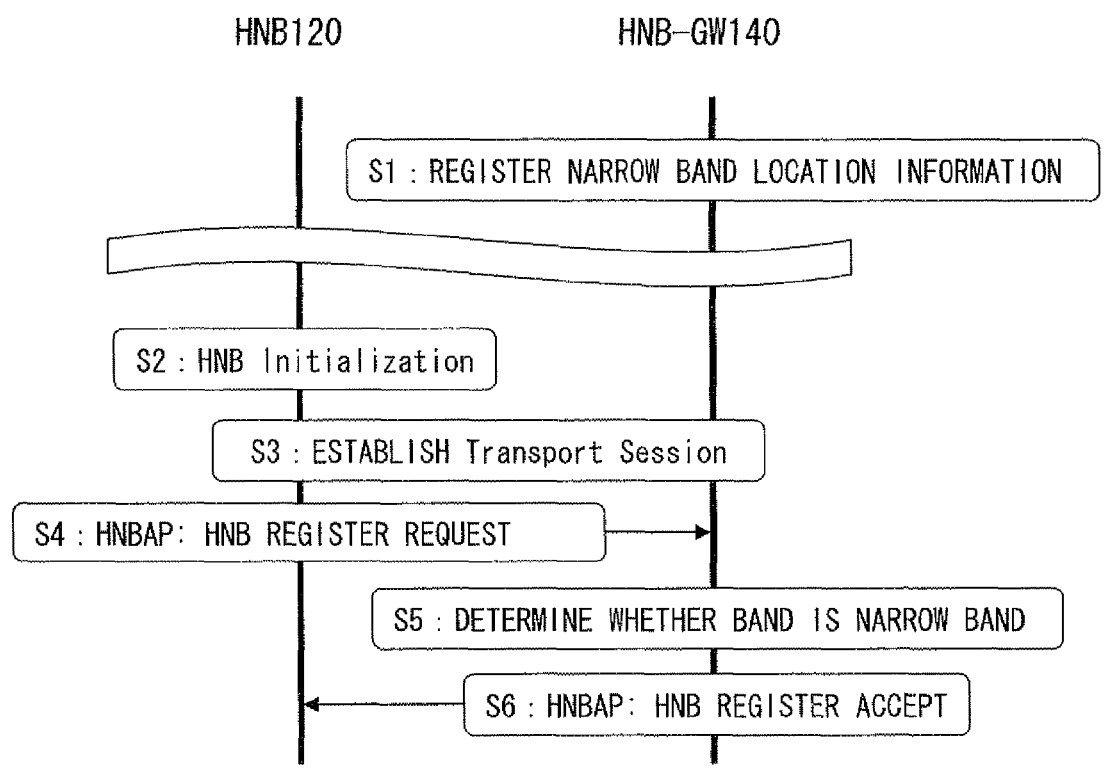
FIG. 2 is a flowchart showing processing for determining whether a band used by an HNB is a narrow band in the femto system shown in FIG. 1.

The narrow band determination unit 150 determines whether the band of the network 130 is a narrow band in an authentication procedure (HNB Registration procedure) started when the HNB 120 connects to the HNB-GW 140 for the first time. Referring to FIG. 2, the description will be made.

In FIG. 2, Step S1 is a procedure for registering the narrow band location information in the HNB-GW 140 in advance, and Steps S2 to S6 are processing included in the HNB Registration procedure. Each of Steps S2 to S6 except Step S5 is the HNB Registration procedure in a normal femto system.

In Step S4, the HNB 120 transmits an "HNB REGISTER REQUEST" message to the HNB-GW 140. In this message, the aforementioned parameters "HNB Location Information", "LAC", "RAC", and "SAC" are included. These parameters are information that may indicate the location in which the HNB 120 is arranged.

The narrow band determination unit 150 in the HNB-GW 140 acquires, in Step S5, the aforementioned parameters included in the "HNB REGISTER REQUEST" message as the information indicating the location in which the HNB 120 is arranged, and compares the acquired information with narrow band location information which is registered in advance. When the location in which the HNB 120 is arranged corresponds to any of the locations indicated by the narrow band location information, it is determined that the band of the network 130 is a narrow band. On the other hand, when the location in which the HNB 120 is arranged does not correspond to any one of the locations indicated by the narrow band location information, it is determined that the band of the network 130 is not a narrow band.

When it is determined by the narrow band determination unit 150 that the band is a narrow band, the conversion unit 160 in the HNB-GW 140 converts a bit rate of the voice data from the MGW 170 to a low bit rate, and then transfers the voice data to the HNB 120. When the conversion is performed, the bit rate supported by the UE 110 connected to the HNB 120 is checked, and the voice data is converted to a low bit rate supported by the UE 110. In the femto system, the voice data is transferred after being coded. In the first exemplary embodiment, it is assumed that the voice data is transmitted after being coded by a codec system called an Adaptive Multi-Rate (AMR). Here, it is assumed that the voice data from the MGW 170 is the data of AMR 12.2 kbps widely used in voice communication systems. Further, as an example, in the first exemplary embodiment, the conversion unit 160 converts the voice data from the MGW 170 from AMR 12.2 kbps to AMR 4.75 kbps which is the lowest AMR as a low bit rate when it is determined by the narrow band determination unit 150 that the band is a narrow band and the UE 110 supports AMR 4.75 kbps.

In the femto system, processing called "AMR start" is performed prior to the transfer of voice data between the UE and the MGW. In this processing, information regarding AMR is exchanged among the UE, the HNB, and the MSC, to determine the AMR bit rate. The AMR start is performed when there is a call to the UE and there is a call from the UE. After the AMR start, the voice data is transferred according to the phone call.

In the case of the AMR start by the call from the UE, a SETUP message for Call Control (CC) is transmitted from the UE to the HNB-GW in a NAS Procedure. In the case of the AMR start by the call to the UE, a CALL CONFIRM message for CC is transmitted from the UE to the HNB-GW in the NAS Procedure. In the normal femto system, these messages are transferred to the MSC by the HNB-GW. In the femto system 100 according to the first exemplary embodiment, the HNB-GW 140 further checks the AMR ability of the UE 110 based on the message by the conversion unit 160 in addition to the transfer stated above. The AMR ability of the UE 110 means the AMR bit rate supported by the UE 110. The parameter "Supported Codec List" is included in the SETUP message and the CALL CONFIRM message that are described above. It is possible to check the AMR bit rate supported by the UE 110 by referring to this parameter. In the first exemplary embodiment, the conversion unit 160 checks whether the UE 110 supports AMR 4.75 kbps from the aforementioned parameter. In the following processing, the conversion unit 160 holds the results of this check in association with the UE 110. In the following description, it is assumed that the conversion unit 160 has already grasped the AMR ability of the UE 110.

Figure 3:
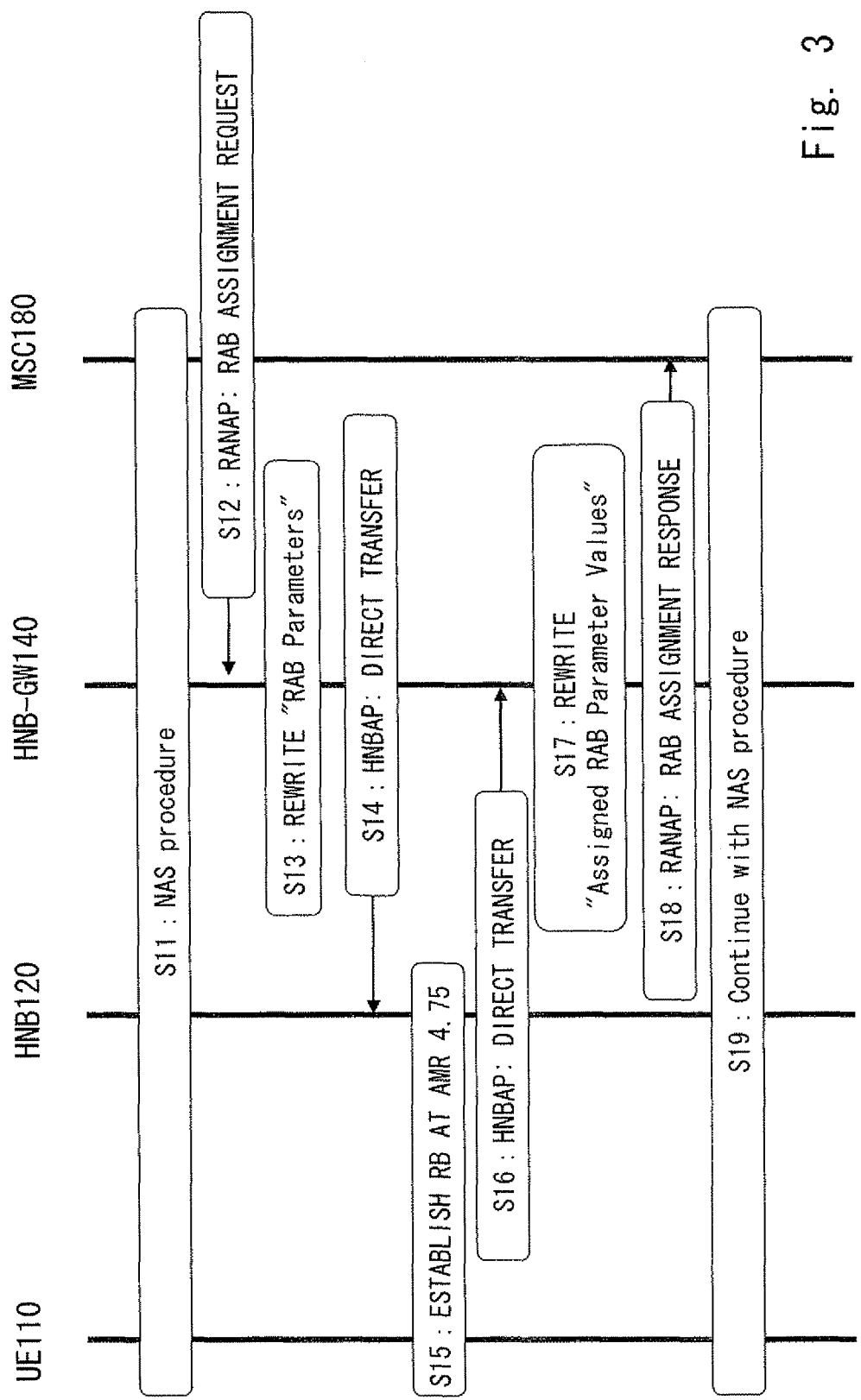
FIG. 3 is a diagram showing procedures for starting an AMR in the femto system shown in FIG. 1.

Referring to FIG. 3, the processing will be described of the AMR start in the femto system 100 when the band of the network 130 is a narrow band and the UE 110 which has received a call or has made a call supports AMR 4.75 kbps.

When there is a call to the UE 110 or a call from the UE 110, the NAS Procedure is performed first among the UE 110, the HNB 120, the HNB-GW 140, and the MSC 180 (S11). Then, a "RANAP: RAB ASSIGNMENT REQUEST" message is transmitted from the MSC 180 to the HNB-GW 140 (S12). This message includes a parameter "RAB Parameters" defined in the chapter 9.1.3 of the non-patent literature 4. This parameter indicates the AMR bit rate of the voice data transmitted to the UE 110. In the first exemplary embodiment, the value corresponding to 12.2 kbps is set. This step is the procedure performed in the normal femto system.

Next, the HNB-GW 140 transfers a "RANAP: RAB ASSIGNMENT REQUEST" message to the HNB 120. In the normal femto system, this "RANAP: RAB ASSIGNMENT REQUEST" message is directly transferred to the HNB 120. In the first embodiment, when it is determined that the network 130 is a narrow band and the UE 110 supports AMR 4.75 kbps, the conversion unit 160 in the HNB-GW 140 rewrites the value of the parameter "RAB Parameters" included in the message to the value corresponding to AMR 4.75 kbps to transmit the message to the HNB 120 (S13, S14).

In this way, a radio bearer (RB) is established at AMR 4.75 kbps between the UE 110 and the HNB 120 (S15).

Upon establishment of the RB, after Step S16, the "HNBAP: RAB ASSIGNMENT RESPONSE" message from the HNB 120 is transferred by the HNB-GW 140. This message includes a parameter "Assigned RAB Parameter Values" defined in the chapter 9.1.4 of the non-patent literature 4. Now, this parameter included in the message from the HNB 120 is the value corresponding to AMR 4.75 kbps.

In the normal femto system, this message is directly transferred to the MSC 180. In the first exemplary embodiment, the HNB-GW 140 rewrites the value of the parameter included in the message "Assigned RAB Parameter Values" from the value corresponding to AMR 4.75 kbps to AMR 12.2 kbps to transmit the message to the MSC 180 (S17, S18).

Thus, the AMR start is completed.

In the following processing, the HNB-GW 140 relays transmission and reception of voice data between the MGW 170 and the UE 110 (S19-). When the relay is performed, the conversion unit 160 converts the bit rate of the voice data. More specifically, when the voice data from the MGW 170 is transferred to the UE 110, the conversion unit 160 first converts the voice data of AMR 12.2 kbps received from the MGW 170 into voice data of Pulse Code Modulation (PCM). Then, the conversion unit 160 converts the PCM voice data into the voice data of AMR 4.75 kbps to transmit this data to the UE 110. When the voice data from the UE 110 is transferred to the MGW 170, the conversion unit 160 converts the voice data of AMR 4.75 kbps received from the UE 110 into the PCM data, and converts the PCM data into the voice data of AMR 12.2 kbps to transmit the data to the MGW 170.

The conversion from the voice data of AMR to the voice data of PCM, and the conversion from the voice data of PCM to the voice data of AMR have already been well known. Thus, detailed description thereof will be omitted.

As described above, in a case in which the band of the network 130 is a narrow band and the UE 110 supports a low AMR bit rate, when the "RANAP: RAB ASSIGNMENT REQUEST" message from the MSC 180 is transferred to the HNB 120 during the AMR start, the HNB-GW 140 of the femto system 100 according to the first exemplary embodiment rewrites the value of the parameter included in the message "RAB Parameters" to a value corresponding to a low bit rate supported by the UE 110, and rewrites the value of the parameter "Assigned RAB Parameter Values" included in the "HNBAP: RAB ASSIGNMENT RESPONSE" message from the HNB 120 to the AMR bit rate of the MSC 180. After that, when the voice data is transferred between the UE 110 and the MGW 170, the bit rate of the voice data received from the MGW 170 is decreased and then the data is transferred to the UE 110, and the bit rate of the voice data received from the UE 110 is increased and then the data is transferred to the MGW 170. Thus, even when the band of the network 130 is a narrow band, it is possible to avoid degradation of the voice due to band shortage since the bit rate of the voice data communicated between the HNB 120 and the HNB-GW 140 is low. Further, since only the HNB-GW is different compared to the related femto system, the UE, the MGW, and the MSC that are similar to the related ones may be used.

Hereinafter, other exemplary embodiments of the present invention will be described. Each of the exemplary embodiments relates to a femto system, and the basic configurations are similar to those of the femto system 100. Accordingly, only the difference from the femto system 100 will be described, and the functional blocks will be denoted by the same names and reference symbols as in the femto system 100 in the description of the following exemplary embodiments.

<Second Exemplary Embodiment>

A femto system according to a second exemplary embodiment of the present invention is different from the femto system 100 in that the HNB 120 measures the band that the HNB 120 uses (i.e., band of the network 130) and reports the band to the HNB-GW 140, and the HNB-GW 140 determines whether the band of the network 130 is a narrow band based on the report from the HNB 120. Description will be made with reference to FIGS. 4 and 5.

Figure 4:
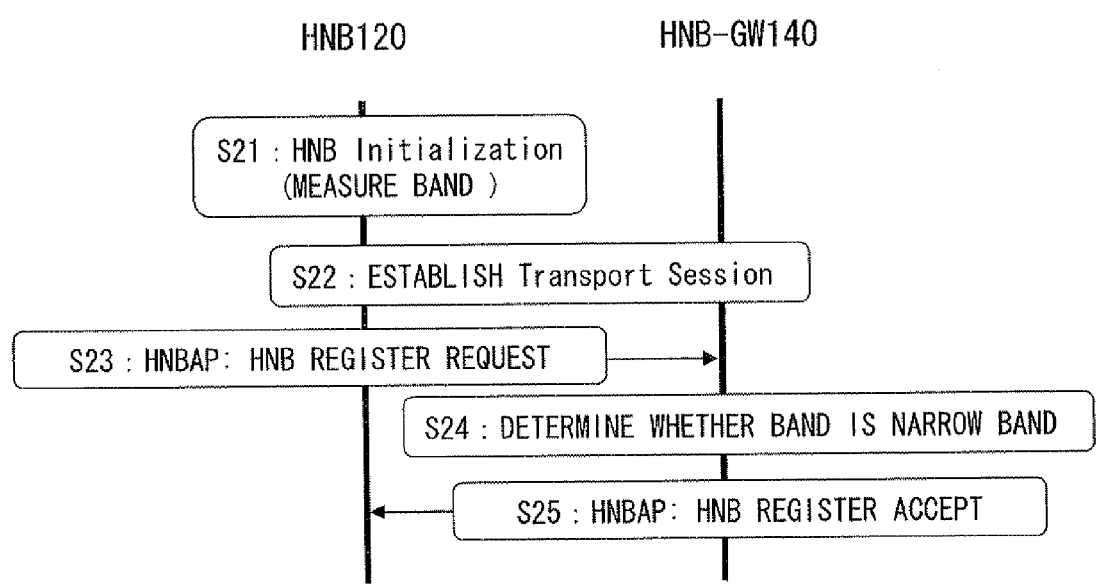
FIG. 4 is a flowchart showing processing for determining whether a band that is used is a narrow band in a femto system according to a second exemplary embodiment of the present invention.

As shown in FIG. 4, the HNB 120 measures the band that the HNB 120 uses during the execution of initialization (HNB Initialization) (S21). Various methods that have already been known may be used as the method of measuring the band.

After initialization, Transport Session is established between the HNB 120 and the HNB-GW 140 (S22).

Then, the HNB 120 transmits the "HNBAP: HNB REGISTER REQUEST" message to the HNB-GW 140. FIG. 5 shows an example of this message. In the example shown in FIG. 5, each parameter except a parameter "LAN bandwidth" which is in the lowermost column is a parameter defined in the non-patent literature 2, and is also included in the "HNBAP: HNB REGISTER REQUEST" message in the normal femto system.

In the second exemplary embodiment, the HNB 120 measures the band during the execution of HNB Initialization, and sets the information indicating the band that is measured to the parameter "LAN bandwidth" added to the "HNBAP: HNB REGISTER REQUEST" message.

Referring back to FIG. 4, the description will be continued.

Upon receiving the "HNBAP: HNB REGISTER REQUEST" message from the HNB 120, the HNB-GW 140 determines whether the band used by the HNB 120, i.e., the band of the network 130 is a narrow band based on the value of the parameter "LAN bandwidth" included in the message. More specifically, when the value of the parameter "LAN bandwidth" is equal to or smaller than a predetermined threshold, it is determined that the band is a narrow band; when the value of the parameter "LAN bandwidth" is larger than a predetermined threshold, it is determined that the band is not a narrow band.

The femto system according to the second exemplary embodiment is similar to the femto system 100 regarding the following operations, and the same effect to the femto system 100 may be obtained. Further, there is no need to register the narrow band location information used in the femto system 100.

<Third Exemplary Embodiment>

A femto system according to a third exemplary embodiment of the present invention is different from the femto system 100 in that the HNB-GW 140 determines whether the band of the network 130 is a narrow band using an RTP timestamp of voice data received from the UE 110 and time at which the voice data is received, and that it is necessary to always execute processing to grasp the AMR ability of the UE 110 in order to make a determination after the AMR start.

An RTP header is added to the voice data transmitted from the HNB 120, and this voice data includes the RTP timestamp as defined in the chapter 5.1 of the non-patent literature 5.

In the third exemplary embodiment, upon receiving the voice data (RTP packet) from the HNB 120, the HNB-GW 140 compares the time at which the RTP packet is received with the RTP timestamp included in the RTP header of the RTP packet to calculate the arrival time of the RTP packet from the HNB 120 to the HNB-GW 140. When the ratio of the RTP packet of which the arrival time is equal to or more than a predetermined threshold in a predetermined period is equal to or larger than a predetermined ratio, it is determined that the band used by the HNB 120, i.e., the band of the network 130 is a narrow band. In the following processing, it is determined whether the UE 110 supports AMR 4.75 kbps with respect to the AMR started from the HNB 120. When the UE 110 supports AMR 4.75 kbps, as is similar to the femto system 100, parameters are rewritten and the bit rate of the voice data is converted. Otherwise, rewriting of parameters and the conversion of the bit rate of the voice data are not conducted.

In the femto system according to the third exemplary embodiment, the same effect as in the femto system 100 may be obtained. Further, there is no need to register the narrow band location information used in the femto system 100.

Note that it is desirable to consider the number of calls and the type of calls started in the corresponding HNB when the RTP packet is received to determine the threshold of the arrival time and the threshold of the ratio of the RTP packet. It is determined that the band is narrower in a delay occurred in a state in which a small number of UEs start calls compared to a delay occurred in a state in which a large number of UEs start calls. Further, it is determined that the band is narrower in a delay occurred in a state in which calls with small data rate are started compared to a delay occurred in a state in which calls with large data rate are started.

<Fourth Exemplary Embodiment>

A femto system according to a fourth exemplary embodiment of the present invention is different from the femto system 100 in that the HNB-GW 140 determines whether the band used by the HNB 120 is a narrow band by executing a ping command in a state in which the HNB 120 has already been started.

When at least one call is started in the HNB 120, the HNB-GW 140 transmits ping commands to the HNB 120 at predetermined cycles.

Then, the HNB-GW 140 receives a response to the ping command from the HNB 120, calculates a round-trip time, and takes the statistics thereof. The HNB-GW 140 determines that the band used by the HNB 120 is a narrow band when the ratio of the ping command whose round-trip time is equal to or larger than a predetermined threshold becomes equal to or larger than a predetermined ratio. In the following processing, it is determined whether the UE 110 supports AMR 4.75 kbps with respect to the AMR started from the HNB 120. When the UE 110 supports AMR 4.75 kbps, as is similar to the femto system 100, parameters are rewritten and the bit rate of the voice data is converted. Otherwise, rewriting of parameters and the conversion of the bit rate of the voice data are not performed.

Also in the femto system according to the fourth exemplary embodiment, the same effect as in the femto system 100 can be obtained. Further, there is no need to register the narrow band positional information used in the femto system 100.

Note that it is preferable to consider the number of calls and the type of calls started in the HNB when the ping command is executed to determine the threshold of the round-trip time and the threshold of the ratio of the ping command. It is determined that the band is narrower in a delay occurred in a state in which a small number of UEs start calls compared to a delay occurred in a state in which a large number of UEs start calls. Further, it is determined that the band is narrower in a delay occurred in a state in which calls with small data rate are started compared to a delay occurred in a state in which calls with large data rate are started.

<Fifth Exemplary Embodiment>

A femto system according to a fifth exemplary embodiment of the present invention is different from the femto system 100 in that it includes an AMR frame multiplexing function of executing AMR frame multiplexing on voice data when the HNB-GW 140 transfers the voice data to the HNB 120, and includes a function of notifying the HNB-GW 140 that the HNB 120 supports the AMR frame multiplexing function when the HNB 120 supports the AMR frame multiplexing function.

The AMR frame multiplexing is the processing for multiplexing a plurality of AMR frames to one RTP payload to reduce the size of the header.

Figure 6:
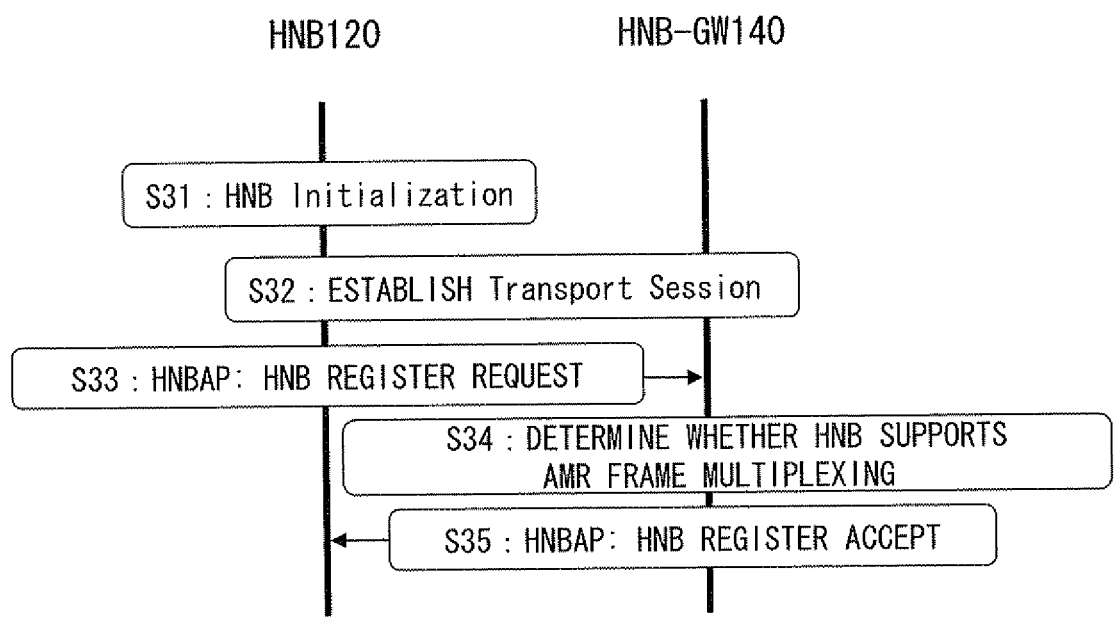
FIG. 6 is a flowchart showing processing for determining whether an HNB supports AMR frame multiplexing in a femto system according to a fifth exemplary embodiment of the present invention.

Referring to FIGS. 6 to 8, the processing for determining whether the HNB 120 supports the AMR frame multiplexing function by the HNB-GW 140 will be described.

This determination is performed in an authentication procedure (HNB Registration procedure) that is started when the HNB 120 is connected to the HNB-GW 140 for the first time. In FIG. 6, each step except Step S34 is the procedure of the HNB Registration procedure in the normal femto system.

In Step S33, the HNB 120 transmits the "HNBAP: HNB REGISTER REQUEST" message to the HNB-GW 140. FIG. 7 shows an example of this message. In the example shown in FIG. 7, each parameter except the parameter in the lowermost column "AMR frame multiplexing support" is the one defined in the non-patent literature 2, and is also included in the "HNBAP: HNB REGISTER REQUEST" message in the normal femto system.

In the fifth exemplary embodiment, when the HNB 120 itself supports the AMR frame multiplexing function, as shown in FIG. 7, the HNB 120 additionally sets the parameter "AMR frame multiplexing support" indicating that it supports the AMR frame multiplexing function to the normal "HNBAP: HNB REGISTER REQUEST" message.

Referring back to FIG. 6, the description will be made.

Upon receiving the "HNBAP: HNB REGISTER REQUEST" message from the HNB 120, the HNB-GW 140 checks whether the parameter "AMR frame multiplexing support" is included in the message, to determine whether the HNB 120 supports the AMR frame multiplexing function (S34).

When the HNB 120 supports the AMR frame multiplexing function, the HNB-GW 140 sets, in the "HNBAP: HNB REGISTER ACCEPT" message transmitted back to the HNB 120, the parameter "maxptime" indicating the AMR frame multiplexing shown in the lowermost column in FIG. 8, for example, in addition to the normal parameter. The parameter "maxptime" is set to the maximum time length of the voice data included in one RTP packet, and the number of voice data frames included in one RTP payload can be determined from the parameter "maxptime".

In the following processing, the HNB-GW 140 performs queuing on the AMR frame received from the MGW 170 for up to the time of "maxptime". After that, the AMR frame that is queued is transmitted to the HNB 120 as one RTP payload. The HNB 120 generates a plurality of AMR frames from one RTP payload received from the HNB-GW 140, to transmit the generated AMR frames to the corresponding UE 110.

Further, the HNB 120 that supports the AMR frame multiplexing function performs the similar AMR frame multiplexing also when voice data is transmitted to the HNB-GW 140. The HNB-GW 140 generates a plurality of AMR frames from one RTP payload received from the HNB 120 to transmit the AMR frames to the MGW 170.

When the HNB 120 that does not support the AMR frame multiplexing function is used, the HNB-GW 140 does not execute AMR frame multiplexing.

In this way, the femto system according to the fifth exemplary embodiment performs the similar processing as the femto system 100. Further, when the HNB 120 that supports the AMR frame multiplexing function is used, the voice data transmitted by the HNB 120 and the HNB-GW 140 is further compressed by the AMR frame multiplexing, thereby providing an effect to overcome the problem of band shortage.

<Sixth Exemplary Embodiment>

A femto system according to a sixth exemplary embodiment of the present invention is different from the femto system 100 in that it includes an RTP packet multiplexing function of executing RTP packet multiplexing on voice data when the HNB-GW 140 transfers the voice data to the HNB 120, and includes a function of notifying the HNB-GW 140 that the HNB 120 supports the RTP packet multiplexing function when the HNB 120 supports the RTP packet multiplexing function.

The RTP packet multiplexing is the processing for multiplexing a plurality of RTP packets to one UDP payload to reduce the size of the header.

Figure 9:
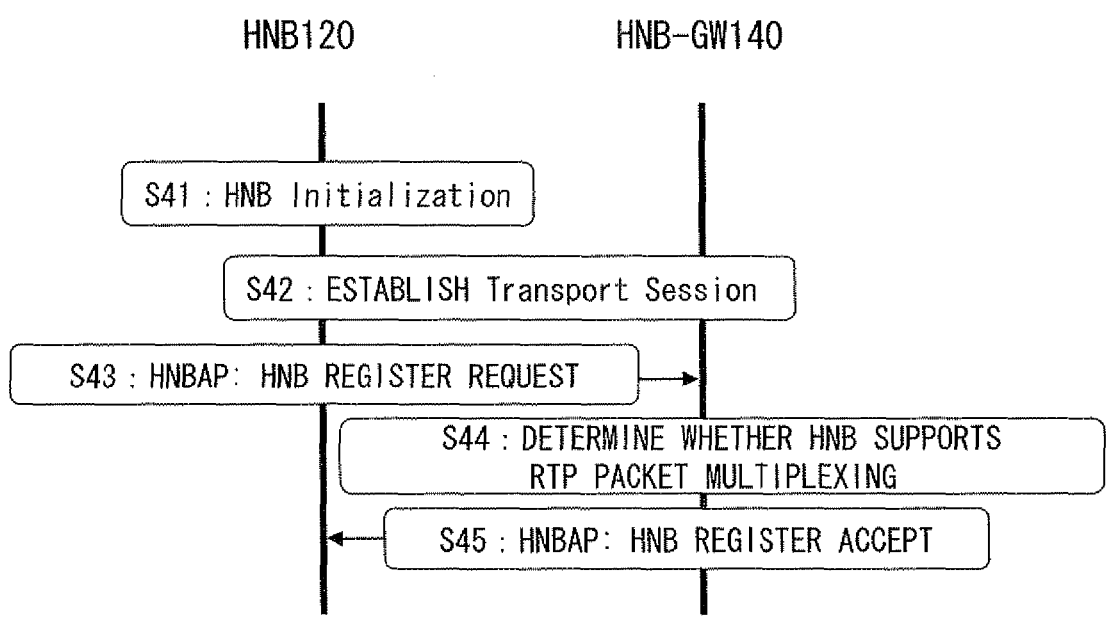
FIG. 9 is a flowchart showing processing for determining whether an HNB supports RTP packet multiplexing in a femto system according to a sixth exemplary embodiment of the present invention.

Referring to FIGS. 9 to 11, processing for determining whether the HNB 120 supports the RTP packet multiplexing function by the HNB-GW 140 will be described.

This determination is performed in an authentication procedure (HNB Registration procedure) started when the HNB 120 is connected to the HNB-GW 140 for the first time. In FIG. 9, each step other than Step S44 is the procedure of the HNB Registration procedure in the normal femto system.

In Step S43, the HNB 120 transmits the "HNBAP: HNB REGISTER REQUEST" message to the HNB-GW 140. FIG. 10 shows an example of this message. In the example shown in FIG. 10, each parameter except the parameter "DL Mux Port Number" which is in the lowermost column is the parameter defined in the non-patent literature 2, and is also included in the "HNBAP: HNB REGISTER REQUEST" message in the normal femto system.

In the sixth exemplary embodiment, when the HNB 120 supports the RTP packet multiplexing function, the HNB 120 adds the parameter "DL Mux Port Number" indicating that the HNB 120 supports the RTP packet multiplexing function to the normal "HNBAP: HNB REGISTER REQUEST" message, as shown in FIG. 10. The parameter "DL Mux Port Number" is set to the number of the UDP port received by the HNB 120 when RTP packet multiplexing is used.

Referring back to FIG. 9, the description will be continued.

Upon receiving the "HNBAP: HNB REGISTER REQUEST" message from the HNB 120, the HNB-GW 140 checks whether the parameter "DL Mux Port Number" is included in the message, to determine whether the HNB 120 supports the RTP packet multiplexing function (S44)

When the HNB 120 supports the RTP packet multiplexing function, the HNB-GW 140 sets, in the "HNBAP: HNB REGISTER ACCEPT" message transmitted back to the HNB 120, the parameters "ULMux Port Number" and "Length Indicator" indicating the RTP packet multiplexing shown in the lowermost two columns in FIG. 11, for example, in addition to the normal parameter. The parameter "ULMux Port Number" is set to the UDP port number received by the HNB-GW 140 when the RTP packet multiplexing is used. The parameter "Length Indicator" is set to the maximum data length of one RTP packet, and the number of RTP packets included in one UDP payload can be determined from the parameter "Length Indicator".

In the following processing, the HNB-GW 140 performs queuing on the RTP packet received from the MGW 170 according to the size determined from "Length Indicator" at maximum. After that, the RTP packet that is queued is transmitted to the HNB 120 as one UDP payload. The HNB 120 generates a plurality of RTP packets from one UDP payload received from the HNB 140 to transmit the RTP packets to the corresponding UE 110.

Further, the HNB 120 that supports the RTP packet multiplexing function performs the similar RTP packet multiplexing also when the HNB 120 transmits voice data to the HNB-GW 140. The HNB-GW 140 generates a plurality of RTP packets from one UDP payload received from the HNB 120 to transmit the RTP packets to the MGW 170.

When the HNB 120 that does not support the RTP packet multiplexing function is used, the HNB-GW 140 does not execute RTP packet multiplexing.

In this way, the femto system according to the sixth exemplary embodiment performs the similar processing as the femto system 100. Further, when the HNB 120 that supports the RTP packet multiplexing function is used, the voice data transmitted by the HNB 120 and the HNB-GW 140 is further compressed by RTP packet multiplexing, thereby providing an effect to overcome the problem of band shortage.

<Seventh Exemplary Embodiment>

A femto system according to a seventh exemplary embodiment of the present invention is different from the femto system 100 in that it includes a UDP packet multiplexing function of executing UDP packet multiplexing on voice data when the HNB-GW 140 transfers the voice data to the HNB 120, and includes a function of notifying the HNB-GW 140 that the HNB 120 supports the UDP packet multiplexing function when the HNB 120 supports the UDP packet multiplexing function.

The UDP packet multiplexing is the processing for multiplexing a plurality of UDP packets to one IP payload to reduce the size of the header.

Figure 12:
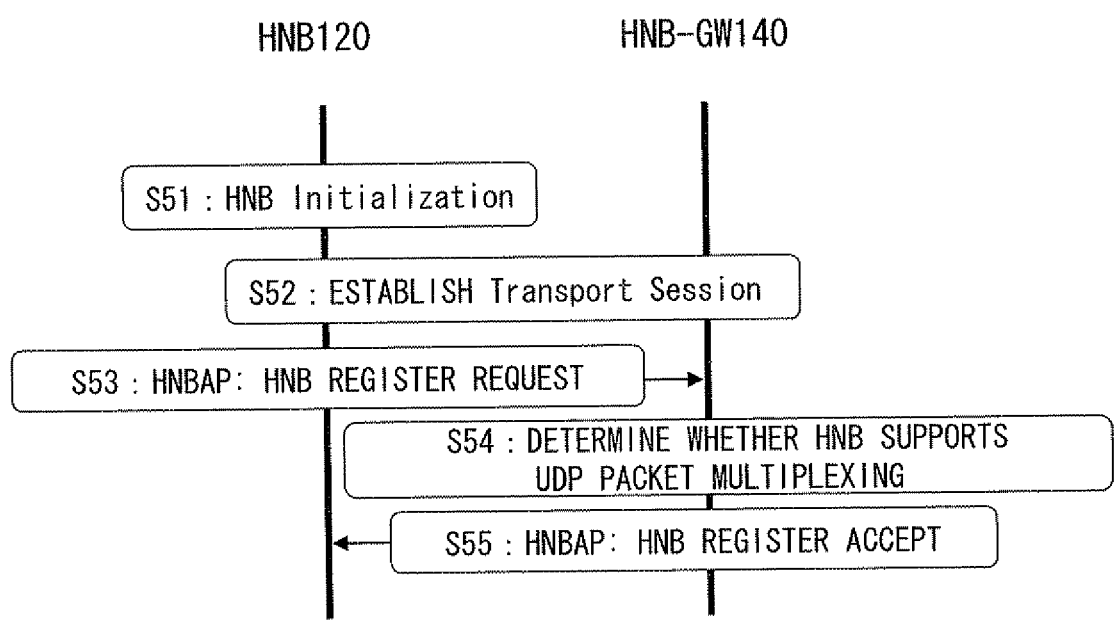
FIG. 12 is a flowchart showing processing whether an HNB supports UDP packet multiplexing in a femto system according to a seventh exemplary embodiment of the present invention.

Referring to FIGS. 12 to 14, processing for determining whether the HNB 120 supports the UDP packet multiplexing function by the HNB-GW 140 will be described.

This determination is performed in an authentication procedure (HNB Registration procedure) started when the HNB 120 is connected to the HNB-GW 140 for the first time. In FIG. 12, each step except Step S54 is a procedure of the HNB Registration procedure in the normal femto system.

In Step S53, the HNB 120 transmits the "HNBAP: HNB REGISTER REQUEST" message to the HNB-GW 140. FIG. 13 shows an example of this message. In the example shown in FIG. 13, each parameter except the parameter "UDP packet multiplexing support" which is in the lowermost column is the one defined in the non-patent literature 2, and is also included in the "HNBAP: HNB REGISTER REQUEST" message in the normal femto system.

In the seventh exemplary embodiment, the HNB 120 adds the parameter "UDP packet multiplexing support" indicating that the HNB 120 supports the UDP packet multiplexing function to the normal "HNBAP: HNB REGISTER REQUEST" message as shown in FIG. 13 when the HNB 120 supports the UDP packet multiplexing function.

Going back to FIG. 12, description will be continued.

Upon receiving the "HNBAP: HNB REGISTER REQUEST" message from the HNB 120, the HNB-GW 140 checks whether the message includes the parameter "UDP packet multiplexing support" to determine whether the HNB 120 supports the UDP packet multiplexing function (S54).

When the HNB 120 supports the UDP packet multiplexing function, the HNB-GW 140 sets, in the "HNBAP: HNB REGISTER ACCEPT" message transmitted back to the HNB 120, the parameter "Maximum Message Size" indicating the UDP packet multiplexing shown in the lowermost column of FIG. 14, for example, in addition to the normal parameter. The parameter "Maximum Message Size" is set to the maximum data length of one IP payload, and the number of voice data frames included in one IP payload can be determined from the "Maximum Message Size".

In the following processing, the HNB-GW 140 performs queuing on the UDP packet received from the MGW 170 according to the size determined from the "Maximum Message Size" at maximum. Then, the UDP packet that is queued is transmitted to the HNB 120 as one IP payload.

Further, the HNB 120 that supports the UDP packet multiplexing function performs the similar UDP packet multiplexing also when the HNB 120 transmits the voice data to the HNB-GW 140. The HNB-GW 140 generates a plurality of UDP packets from one IP payload received from the HNB 120 to transmit the UDP packets to the MGW 170.

When the HNB 120 that does not support the UDP packet multiplexing function is used, the HNB-GW 140 does not execute UDP packet multiplexing.

In this way, the femto system according to the seventh exemplary embodiment performs the similar processing as the femto system 100. Further, when the HNB 120 that supports the UDP packet multiplexing function is used, the voice data transmitted by the HNB 120 and the HNB-GW 140 is further compressed by UDP packet multiplexing, thereby providing an effect to overcome the problem of band shortage.

<Eighth Exemplary Embodiment>

A femto system according to an eighth exemplary embodiment of the present invention is different from the femto system 100 in that it includes a deflate function of executing deflate compression/decompression on voice data when the HNB-GW 140 transfers the voice data to the HNB 120, and includes a function of notifying the HNB-GW 140 that the HNB 120 supports the deflate function when the HNB 120 supports the deflate function.

The deflate function is processing to compress data in a deflate method (deflate compression), and processing to decompress the data that is compressed in the deflate method (deflate decompression), thereby being able to compress the IP payload itself.

Figure 15:
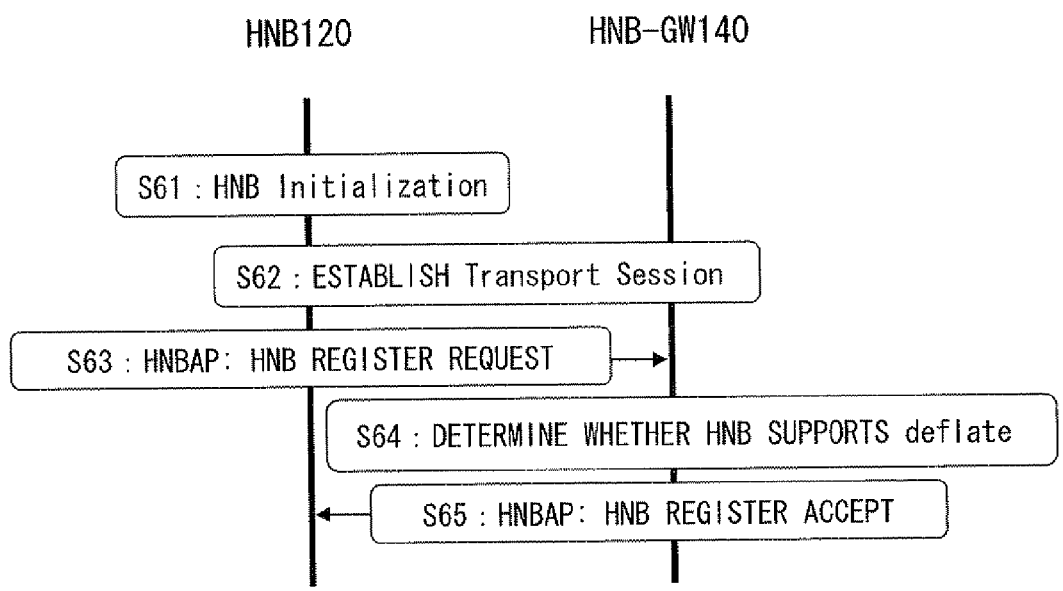
FIG. 15 is a flowchart showing processing for determining whether an HNB supports deflate in a femto system according to an eighth exemplary embodiment of the present invention.
Figure 18:
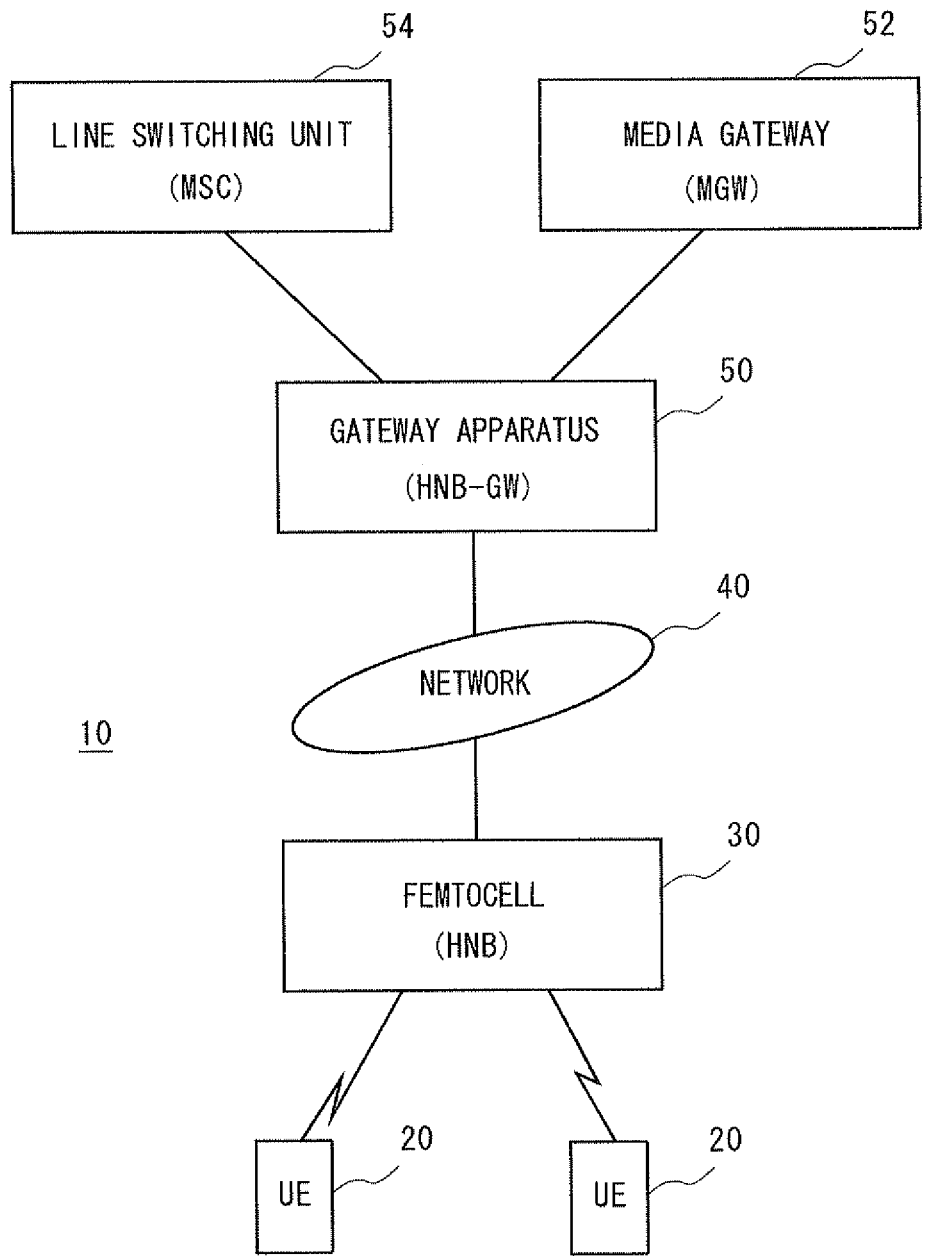
FIG. 18 is a diagram for describing a related femto system.

With reference to FIGS. 15 to 17, processing to determine whether the HNB 120 supports the deflate function by the HNB-GW 140 will be described.

This determination is performed in an authentication procedure (HNB Registration procedure) started when the HNB 120 is connected to the HNB-GW 140 for the first time. In FIG. 15, each step except Step S64 is the procedure of the HNB Registration procedure in the normal femto system.

In Step S63, the HNB 120 transmits the "HNBAP: HNB REGISTER REQUEST" message to the HNB-GW 140. FIG. 16 shows an example of this message. In the example shown in FIG. 16, each parameter except the parameter "deflate support" in the lowermost column is the parameter defined in the non-patent literature 2, and is also included in the "HNBAP: HNB REGISTER REQUEST" message in the normal femto system.

In the eighth exemplary embodiment, when the HNB 120 supports the deflate function, as shown in FIG. 16, the HNB 120 adds the parameter "deflate support" indicating that it supports the deflate function to the normal "HNBAP: HNB REGISTER REQUEST" message.

Referring back to FIG. 15, the description will be continued.

Upon receiving the "HNBAP: HNB REGISTER REQUEST" message from the HNB 120, the HNB-GW 140 checks whether the message includes the parameter "deflate support", to thereby determine whether the HNB 120 supports the deflate function (S64).

When the HNB 120 supports the deflate function, the HNB-GW 140 sets, in the "HNBAP: HNB REGISTER ACCEPT" message transmitted back to the HNB 120, the parameter "deflate" indicating deflate as shown in the lowermost column in FIG. 17, for example, in addition to the normal parameter.

In the following procedures, the HNB-GW 140 performs deflate compression on the IP payload received from the MGW 170, and then transmits the compressed data to the HNB 120.

Further, the HNB 120 that supports the deflate function performs the similar deflate compression also when the HNB 120 transmits the voice data to the HNB-GW 140. The HNB-GW 140 performs deflate decompression on the IP payload received from the HNB 120 to transmit the decompressed data to the MGW 170.

When the HNB 120 that does not support the deflate function is used, the HNB-GW 140 does not execute deflate processing.

In this way, the femto system according to the eighth exemplary embodiment performs the similar processing as in the femto system 100. Further, when the HNB 120 that supports the deflate function is used, the voice data transmitted by the HNB 120 and the HNB-GW 140 is further compressed by the deflate compression, thereby providing an effect to overcome the problem of band shortage.

The present invention has been described according to the exemplary embodiments. It should be noted that the exemplary embodiments are merely the examples, and various changes, modifications, and combination may be added to each exemplary embodiment described above without departing from the spirit of the present invention. A person skilled in the art would understand that various examples to which these changes, modifications, and combination are added are also within the scope of the present invention.

For example, also in a Long Term Evolution (LTE), the technique of the present invention may be applied to the HeNB or the HeNB-GW in the similar way. Further, protocols other than HNBAP, URA, and RANAP used in each exemplary embodiment described above may be used to notify multiplexing information and port information.

Industrial Applicability

The present invention is applicable to relay of voice data between a media gateway and a femtocell.

REFERENCE SIGNS LIST

10 FEMTO SYSTEM
20 UE
30 HNB
40 NETWORK
50 HNB-GW
52 MGW
54 MSC
100 FEMTO SYSTEM
110 UE
120 HNB
130 NETWORK
140 HNB-GW
150 NARROW BAND DETERMINATION UNIT
160 CONVERSION UNIT
170 MGW
180 MSC

The invention claimed is:

1. A gateway apparatus connected to a femtocell via a network and relaying at least one of transmission and reception of voice data between a media gateway and the femtocell, the gateway apparatus comprising:
   narrow band determination means for comparing, based on a parameter sent from the femtocell which indicates the location of the femtocell, the location of the femtocell with narrow band location information indicating the location of a narrow band which is registered before initialization in advance in a database, and for determining whether a band of the network is a narrow band by determining whether the band is lower than or equal to a predetermined threshold; and
   conversion means for converting the voice data to decrease a bit rate of the voice data transferred to the femtocell via the network from the media gateway when it is determined by the narrow band determination means that the band is a narrow band.

2. The gateway apparatus according to claim 1, wherein the conversion means further checks a bit rate that may be supported by a terminal apparatus connected to the femtocell, and
   the bit rate is decreased to a bit rate that may be supported by the terminal apparatus when the voice data is converted.

3. The gateway apparatus according to claim 1, wherein the conversion means further converts the voice data to increase the bit rate of the voice data transferred to the media gateway from the femtocell when it is determined by the narrow band determination means that the band is a narrow band.

4. The gateway apparatus according to claim 2, wherein the conversion means further converts the voice data to increase the bit rate of the voice data transferred to the media gateway from the femtocell when it is determined by the narrow band determination means that the band is a narrow band.

5. The gateway apparatus according to claim 1, wherein the conversion means further performs multiplexing by a multiplexing system with which the femtocell can correspond when the voice data transferred to the femtocell is converted.

6. The gateway apparatus according to claim 2, wherein the conversion means further performs multiplexing by a multiplexing system with which the femtocell can correspond when the voice data transferred to the femtocell is converted.

7. The gateway apparatus according to claim 3, wherein the conversion means further performs multiplexing by a multiplexing system with which the femtocell can correspond when the voice data transferred to the femtocell is converted.

8. The gateway apparatus according to claim 4, wherein the conversion means further performs multiplexing by a multiplexing system with which the femtocell can correspond when the voice data transferred to the femtocell is converted.

9. The gateway apparatus according to claim 5 wherein the multiplexing system is any one of frame multiplexing for multiplexing a plurality of frames to one RTP payload, RTP packet multiplexing for multiplexing a plurality of RTP packets to one UDP payload, and deflate for multiplexing a plurality of UDP packets to one IP payload.

10. The gateway apparatus according to claim 6, wherein the multiplexing system is any one of frame multiplexing for multiplexing a plurality of frames to one RTP payload, RTP packet multiplexing for multiplexing a plurality of RTP packets to one UDP payload, and deflate for multiplexing a plurality of UDP packets to one IP payload.

11. The gateway apparatus according to claim 7, wherein the multiplexing system is any one of frame multiplexing for multiplexing a plurality of frames to one RTP payload, RTP packet multiplexing for multiplexing a plurality of RTP packets to one UDP payload, and deflate for multiplexing a plurality of UDP packets to one IP payload.

12. The gateway apparatus according to claim 8, wherein the multiplexing system is any one of frame multiplexing for multiplexing a plurality of frames to one RTP payload, RTP packet multiplexing for multiplexing a plurality of RTP packets to one UDP payload, and deflate for multiplexing a plurality of UDP packets to one IP payload.

13. The gateway apparatus according to claim 1, wherein the conversion means further performs compression by deflate when the voice data transferred to the femtocell corresponding to the deflate is converted.

14. The gateway apparatus according to claim 2, wherein the conversion means further performs compression by deflate when the voice data transferred to the femtocell corresponding to the deflate is converted.

15. The gateway apparatus according to claim 3, wherein the conversion means further performs compression by deflate when the voice data transferred to the femtocell corresponding to the deflate is converted.

16. The gateway apparatus according to claim 4, wherein the conversion means further performs compression by deflate when the voice data transferred to the femtocell corresponding to the deflate is converted.

17. The gateway apparatus according to claim 5, wherein the conversion means further performs compression by deflate when the voice data transferred to the femtocell corresponding to the deflate is converted.

18. A relay method executing, when relaying at least one of transmission and reception of voice data between a femtocell performing at least one of transmission and reception of voice data with a media gateway via a network and the media gateway, the following processing of: comparing, based on a parameter sent from the femtocell which indicates the location of the femtocell, the location of the femtocell with narrow band location information indicating the location of a narrow band which is registered before initialization in advance in a database, determining whether a band of the network is a narrow band by determining whether the band is lower than or equal to a predetermined threshold, and converting the voice data to decrease a bit rate of the voice data transferred to the femtocell via the network from the media gateway when it is determined that the band is a narrow band.

19. A non-transitory computer readable medium storing a program for causing a computer to execute, when relaying at least one of transmission and reception of voice data between a femtocell performing at least one of transmission and reception of voice data with a media gateway via a network and the media gateway, the following processing of: comparing, based on a parameter sent from the femtocell which indicates the location of the femtocell. the location of the femtocell with narrow band location information indicating the location of a narrow band which is registered before initialization in advance in a database, determining whether a band of the network is a narrow band by determining whether the band is lower than or equal to a predetermined threshold, and converting the voice data to decrease a bit rate of the voice data transferred to the femtocell via the network from the media gateway when it is determined that the band is a narrow band.

20. A femto system, comprising: a media gateway; a femtocell; and a gateway apparatus connected to the femtocell via a network and relaying at least one of transmission and reception of voice data between the media gateway and the femtocell, wherein the gateway apparatus comprises: narrow band determination means for comparing, based on a parameter sent from the femtocell which indicates the location of the femtocell, the location of the femtocell with narrow band location information indicating the location of a narrow band which is registered before initialization in advance in a database, and for determining whether a band of the network is a narrow band by determining whether the band is lower than or equal to a predetermined threshold, and conversion means for converting the voice data to decrease a bit rate of the voice data transferred to the femtocell via the network from the media gateway when it is determined by the narrow band determination means that the band is a narrow band.

* * * * *